Dec. 3, 1968 F. D. GRIFFIN 3,414,358

OPTICAL MONITOR PANEL

Filed July 19, 1966 2 Sheets-Sheet 1

INVENTOR.
FRANCIS D. GRIFFIN
BY James O. Harrell
[signature]
ATTORNEYS

INVENTOR.
FRANCIS D. GRIFFIN
BY James O. Harrell
[signature]
ATTORNEYS

United States Patent Office 3,414,358
Patented Dec. 3, 1968

3,414,358
OPTICAL MONITOR PANEL
Francis D. Griffin, Merritt Island, Fla., assignor to the United States of America as represented by the Administrator of the National Aeronautics and Space Administration
Filed July 19, 1966, Ser. No. 566,392
6 Claims. (Cl. 356—166)

ABSTRACT OF THE DISCLOSURE

A panel consisting of a translucent screen with test or meter information being projected onto it from the rear. With the exception of command switches at the bottom of the panel, the entire panel information is a compilation of light projections. One master projector projects all of the panel nomenclature such as titles, sub-titles, division lines, and component identifications. Smaller individual projectors provide panel viewing of analog and discrete functions.

Figure 1:
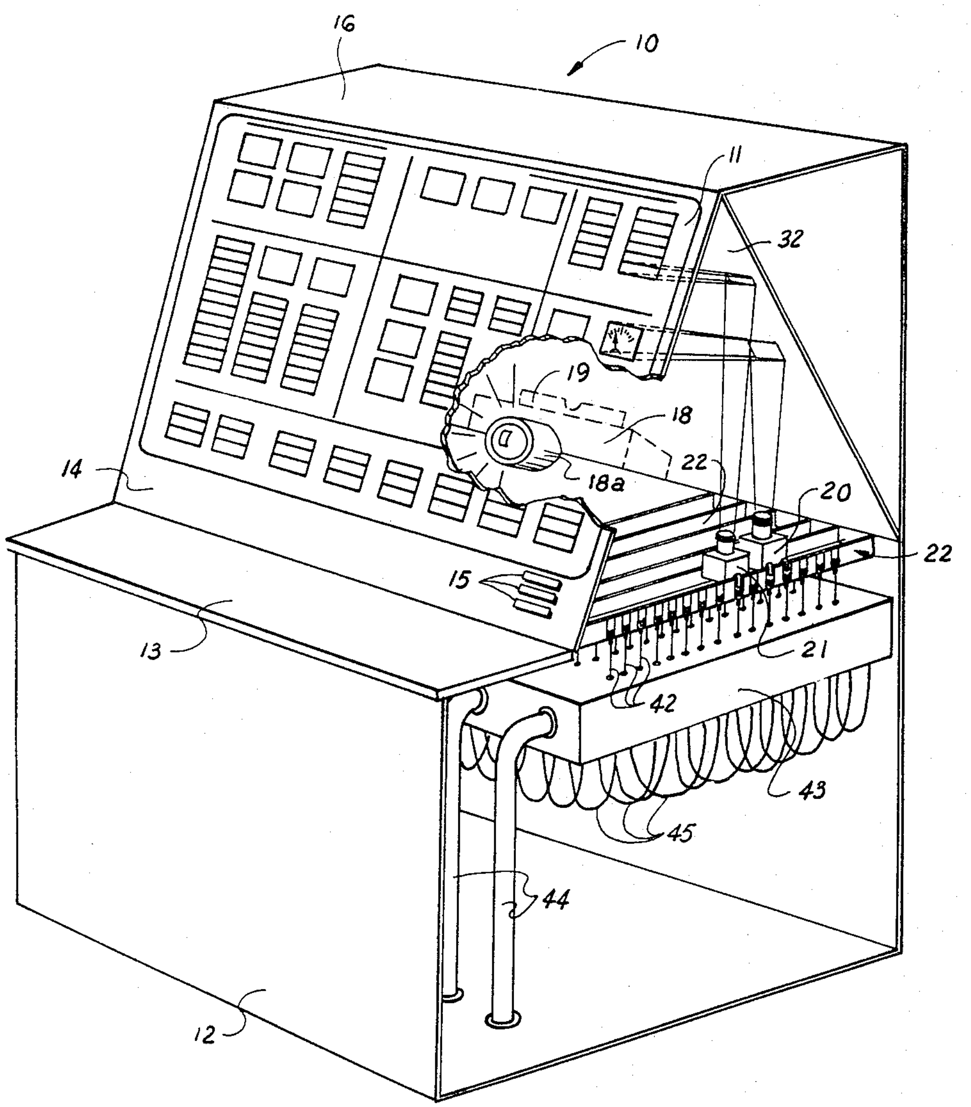

The invention described herein was made by an employee of the United States Government and may be manufactured and used by or for the Government of the United States of America for governmental purposes without the payment of any royalties thereon or therefor.

This invention relates to an optical monitor panel and more particularly to a monitor panel which can be readily redesigned, modified or otherwise, changed without discharding or rendering obsolete previously used panel parts.

Heretofore, panels such as those utilized in control rooms of missile launching, testing, and tracking stations were normally constructed of a permanent material, such as sheet metal. Such panels require sheet metal work, engraving, and the mounting of the meter components thereon. When it is desired that the control room be utilized for monitoring tests of devices other than that for which the panel was constructed, such requires considerable redesigning of the panel boards, as well as considerable expense in constructing a different panel board and mounting the various different meters thereon. For example, in one particular test it may be desired to measure or monitor the electrical system of a missile or the fuel supply and control for such. Such would require a particular panel board having engraving thereon corresponding to the test being performed. Also, particular meters would be required. It may be desired at a later date to utilize the same control room to monitor vibration tests of the missile or monitor the lift off and flight thereof. Such would require an entirely different set of meters, as well as panel boards. Therefore, it can be seen that in using the hardware available at the present time such changeovers are extremely tedious, expensive, and time consuming. As a result many test schedules are hampered by the time consuming task of modifying panel boards and control rooms so that such may be utilized to monitor many different tests.

Another problem with panel boards having meters mounted thereon is that it is difficult to remove the meters in order to service such. Normally, in order to service a particular meter, the meter must be unbolted from the panel board and the wires leading to such must be disconnected therefrom. If several meters of the panel board require servicing, the removal of the bolts and wires therefrom would consume a considerable period of time. Still another problem encountered with meters mounted on panel boards is that it is difficult to receive highly accurate readings due to parallax. While the invention is described herein in the context of a panel board for use in missile projects, it is to be understood that the invention is applicable to a variety of meter board constructions and uses.

In accordance with the present invention, it has been found that the foregoing difficulties and disadvantages presented by the prior panel boards discussed above may be overcome by providing a novel optical monitor panel constructed in accordance with the present invention. A preferred embodiment of the novel optical monitor panel includes the following basic parts: (1) a screen, (2) a light operated device spaced from the screen for projecting a first image on the screen, (3) a plurality of meter assemblies, (4) each assembly including a condition responsive meter, (5) a light source positioned on one side of each of the meters, (6) a projector positioned on the other side of each meter for projecting a second image indicative of the reading of the associated meter, (7) means positioning the assemblies for focusing each second image on the screen in a desired position relative to the first image so that the images of the meter readings are superposed on the first image, (8) a reflective surface positioned intermediate the screen and the meter assemblies for receiving light from the meter assemblies and reflecting same to the screen to form the second image, and (9) a plurality of pairs of spaced rails each having a plurality of conductive segments thereon is provided for supporting and energizing the meter assemblies. The meter assemblies are provided with clamps so that such can be readily inserted between a pair of rails and removed therefrom. The projector means spaced from the screen is adapted to receive a slide having indicia thereon, corresponding to a desired meter panel board. Thus, by changing the slide and meter assembly the optical panel board may be readily modified for monitoring different tests.

Accordingly, it is an object of this invention to provide an instrument panel assembly wherein such can be readily modified.

Another important object of this invention is to provide an optical monitor panel which can be readily changed so that such may be used in fields where test programs are changing rapidly.

Still another important object of the present invention is to provide an optical monitor panel which is relatively inexpensive to maintain and is simple and efficient in its operation.

A further important object of the invention is to provide an optical monitor panel in which there is a deminimis fabrication cost in modifying the panel so that such may be utilized to monitor an unlimited number of testing operations.

Still another important object of this invention is to provide an optical monitor panel which results in a considerable savings in construction and maintenance costs.

A further important object of the present invention is to provide an optical monitor panel assembly including meter assemblies which may be readily removed and inserted therein.

Still another important object of the present invention is to provide an optical monitor panel assembly wherein a panel board may be changed by merely changing a slide, and the meter faces may be changed by clamping meter assemblies in the monitor housing so that such may be used to monitor many different tests.

Figures 2, 3:
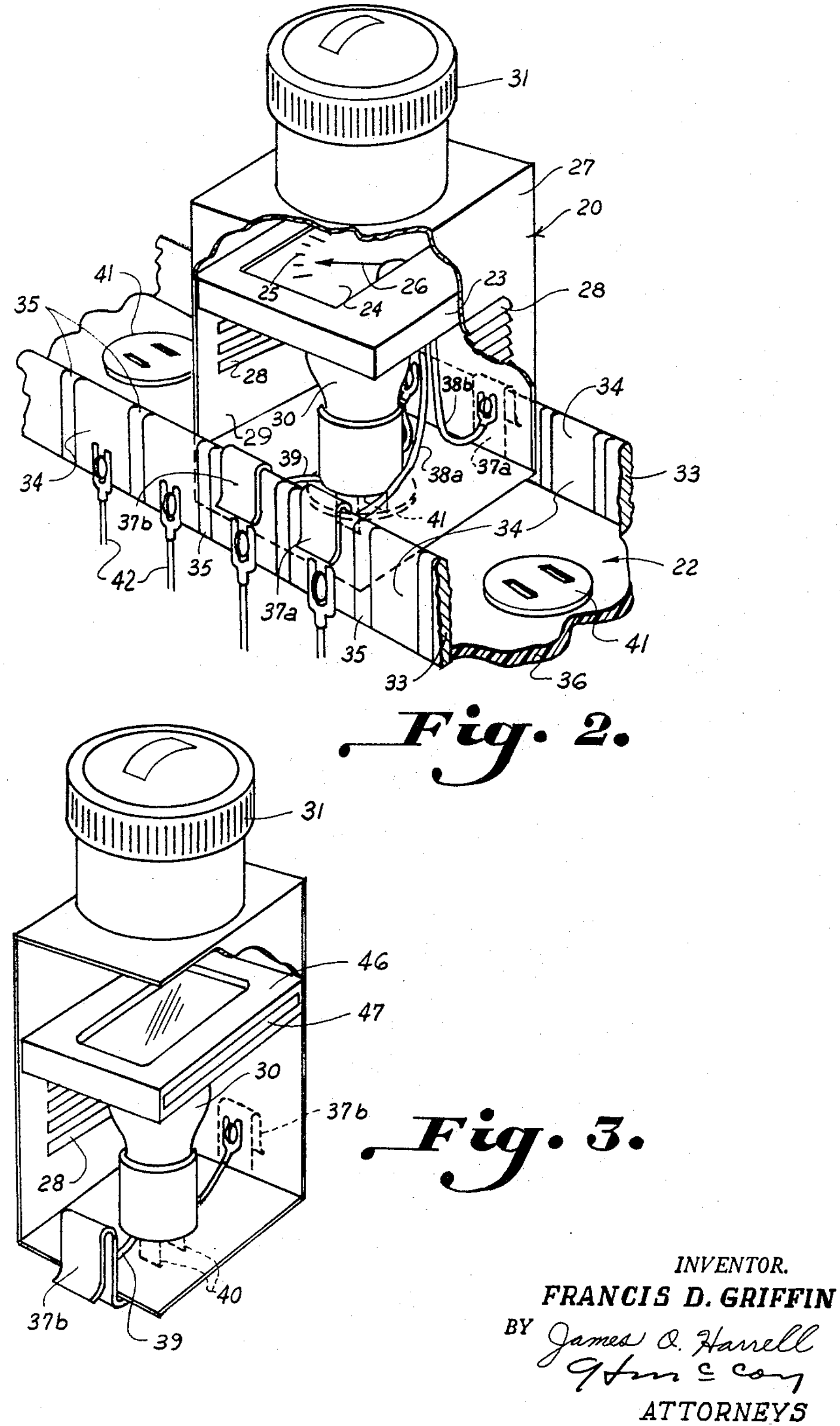

Other objects and advantages of this invention will become more apparent from a reading of the following detailed description and appended claims taken in conjunction with the accompanying drawings wherein:

FIGURE 1 is a front perspective view, partially in section, of an optical monitor panel assembly constructed in accordance with the present invention;

FIGURE 2 is an enlarged perspective view, partially in section, illustrating an analogue meter assembly which may be utilized in the optical monitor panel assembly of FIGURE 1 constructed in accordance with the present invention; and FIGURE 3 is an enlarged perspective view, partially in section, of a digital meter assembly which may be utilized in the optical monitor panel assembly of FIGURE 1 constructed in accordance with the present invention.

Referring now in more detail to the drawings wherein like reference numerals designate identical or corresponding parts throughout the several views and with special attention to FIGURE 1, reference numeral 10 generally designates an optical monitor panel assembly. The optical monitor panel assembly includes a translucent screen 11 carried within a suitable housing. The housing includes a front vertical panel 12 which supports a horizontal shelf 13 which in turn has its free-end attached to an upwardly extending frame 14 upon which the translucent screen 11 is mounted by any suitable means. The frame 14 is illustrated as having three buttons 15 which may be utilized to individually activate any of the metering devices associated with the optical monitor panel assembly. However, in the embodiment illustrated in the drawings only the lower button is being utilized for testing the lamps of the meter assemblies. Such will be discussed more fully below. The upper end of the frame 14 is attached to a top 16 which has a rear edge attached to a back panel 17. Readily removable side panels may be mounted on the optical monitor panel assembly so as to enclose such. The side panels should be suitably mounted for easy removal so that the interior of the assembly is readily accessible.

A single master projector 18 projects the panel nomenclature, such as titles, subtitles, division lines, and component identifications onto the screen 11. The master panel projector 18 is centrally located within the housing and carried by any suitable means for projecting a first image corresponding to the meter panel board onto the screen 11. The master projector 18 may be any suitable conventional slide projector. The slide 19, shown in broken lines, is inserted within the projector and has indicia thereon corresponding to the desired meter panel board which is to be utilized in a test.

In constructing the slide 19, first a panel layout which corresponds to the desired panel board which is to be projected on the screen is drawn by a design engineer. The panel layout is then photographed and a slide is made therefrom. It can be seen that many such slides can be made and by merely changing the slides in the projector 18 the image projected on the screen 11 may be varied. The master projector has a lense 18*a* for focusing the image on the screen 11. The slide projector 18 may be energized by any suitable source of power.

Analogue meter assemblies 20 and digital meter assemblies 21, only one of each being shown in FIGURE 1, are carried on tracks, generally designated at 22, within the optical monitor panel assembly for projecting analogue and discrete images, respectively, on the screen 11 which are indicative of the reading of the associated meters 23 of the meter assemblies 20 and 21. However, in normal operations many such meter assemblies are carried on the tracks 22. These images which correspond to the meter reading are superimposed on the image produced by the master projector 18 so that a composite image corresponding to a panel board with a plurality of operating meters mounted thereon is projected on the screen 11. It is noted that parallax is eliminated since the meter readings are projeced directly onto the screen 11 and thus, readings produced on the screen would be more accurate than if meters were mounted on a panel board.

An analogue meter assembly 20 is illustrated in FIGURE 2. Each analogue meter assembly 20 includes a meter 23 having a transparent face 24 with indicia 25 thereon representing a meter face. A movable indicating arm 26 is operatively carried by the meter 23 and moves responsive to signals being supplied thereto from a functional element (not shown) being utilized in the test. The meter 23 is mounted in the intermediate portion of the projector housing 27 by any suitable means. The projector housing 27 is constructed of any suitable non-conducting material, such as plastic, and has vents 28 in the side wall 29 for permitting the passage of air for cooling the meter assemblies. A fan (not shown) is suitably carried within the optical monitor panel system for forcing air across and through the meter assemblies. A light source, such as an electric lamp 30, is positioned below the meter 23 for projecting light through the transparent face 24 of the meter so that an image corresponding to the indicia 25 carried on the face 24 and the movable arm is projected upwardly to a lense 31 carried on top of the housing 27. By turning the lense 31 the image produced by the indicia on the face of the meter and the movable arm 26 is focused upon a reflective surface 32 which in turn, projects the image onto the screen 11.

Energy for energizing the lamp 30 and signals for energizing the meter 23 are both received from the track 22. The meter assemblies are carried between the rails 33 of the track 22 which have a plurality of longitudinally spaced electrically conductive segments 34 thereon. The electrically conductive segments 34 are insulated from each other by layers of insulating material 35. The rails 33 are attached to a base 36, which is constructed of a non-conducting material, of the track 22 by any suitable means.

Clamps 37*a* and 37*b* are carried on the side of the housing 27 for clamping the meter assembly on the track 22 and making electrical contact with the conductive segments 34. Lead wires 38*a* and 38*b* are connected between a pair of clamps 37*a* for permitting current to flow to the meter 28 for energizing such. The lamp 30 is provided with a pair of lead wires 39, only one being shown, connected between oppositely disposed clamps 37*b* for energizing the lamp. The base of the lamp also has a pair of downwardly extending contacts 40 which are placed within a test socket 41 carried on the base 36. The sockets 41 are provided so that before the testing operation is begun a test button 15 on the frame of the optical monitor panel may be depressed so as to momentarily energize all the lamps of the meter assembly for determining if the lamps are operating properly. The lamp sockets 41 are connected in parallel circuits and energized from any suitable source of power and after the initial testing of the lamps takes place such are no longer energized. Energy is supplied to the individual electrically conductive segments 34 by the leads 42 extending from a patch board assembly 43. The signals from the functional elements being monitored are supplied to the patch board 43 through trunk lines 44 and may be selectively routed to any segment 34 on the tracks by manipulating the patch board leads 45. The patch board 43 is also utilized for placing a voltage from any suitable source on selective segments 34 for energizing the lamps 30 of the metering assemblies. Thus, it can be seen that the meter assemblies can be plugged in any desired position on the tracks 22 and appropriate signals from the functional elements can be fed thereto by shifting the patch board leads 45 or by completely changing the patch board.

The digital meter assembly 21 is constructed in a similar manner as the analogue meter 20 with the exception that instead of an analogue meter being utilized an insert 46 is carried within the housing and is adapted to receive the slides 47 which cause a discrete signal, such as a red or green colored light to be projected on the screen 11. The digital meter assembly is carried within the track 22 in a similar manner as the analogue meter assembly and the lamp 30 associated therewith is energized through the clamps 37*b* and a pair of leads 39. The housing for the digital meter assembly is constructed of a non-conducting material and has vents on the side thereof for permitting air to pass therethrough to cool the lamp 30.

The reflective screen 32 is constructed of any suitable light reflective material, and is mounted within the optical monitor panel assembly at an angle so as to reflect images being projected from the meter assemblies onto the screen 11.

It can be seen that an optical monitor panel assembly constructed in accordance with the present invention may be utilized to monitor many different tests by merely changing the slide 19 in the master projector 18 and mounting the desired meter assemblies at preselected locations on the tracks 22. The signals from the functional elements may be routed to corresponding segments 34 on the tracks 22 for energizing the meter assemblies by merely shifting the patch board leads 45.

Obviously, numerous modifications and variations of the present invention are possible in light of the above teachings. It is therefore, to be understood that within the scope of the appended claims the invention may be practiced otherwise than as specifically described.

What is claimed and desired to be secured by the United States Letters Patent is:

1. An optical monitor panel comprising:
(A) a screen;
(B) projector means spaced from said screen;
(C) a slide having indicia thereon corresponding to a desired meter panel board carried by said protector means;
(D) means for energizing said projector for projecting a first image corresponding to the meter panel board on said slide onto said screen;
(E) a plurality of meter assemblies;
(F) each assembly including a condition responsive meter;
(G) each meter being operatively connected to a functional element being monitored;
(H) a light source positioned on one side of each meter, and
(I) a projector positioned on the other side of each meter for directing a second image indicative of the reading of the associated meter; and
(J) means positioning said assemblies for focusing each second image on the screen in a desired position relative to the first image so that a composite image produced by the first and second images corresponds to a panel board with a plurality of operating meters thereon.

2. An optical monitor panel comprising:
(A) a translucent screen;
(B) a light operated device spaced from said screen for projecting first images corresponding to a meter panel board onto the screen;
(C) a plurality of meter assemblies;
(D) each assembly including a condition responsive meter;
(E) a light source positioned on one side of each meter;
(F) a projector positioned on the other side of each meter for directing a second image corresponding to a meter face which indicates the reading of the associated meter;
(G) a reflective surface intermediate said screen and said meter assemblies for receiving light from said meter assemblies and reflecting same to said screen to form said second image; and
(H) means positioning said assemblies for focusing each second image on the screen in a desired position relative to a first image.

3. The monitor panel as set forth in claim 2 including:
(A) a plurality of pairs of spaced rails;
(B) each rail having a plurality of conductive segments thereon;
(C) corresponding pairs of said conductive segments being electrically connected to a functional element being monitored;
(D) a pair of oppositely disposed electrically conductive clamps carried on said meter assemblies for engaging corresponding pairs of conductive segments for energizing said meter assemblies;
(E) whereby said meter assemblies are removably carried between said spaced rails so that such can be readily changed.

4. The structure as set forth in claim 3 including:
(A) a plurality of sockets carried between said spaced rails;
(B) said light source of each meter assembly being electrically connected to a corresponding socket;
(C) a power supply;
(D) means for selectively connecting said power supply to said sockets for energizing said meter assemblies for determining if such are in proper operating condition.

5. The structure as set forth in claim 4 wherein said meter assemblies are analogue assemblies.

6. The structure as set forth in claim 4 wherein said meter assemblies are digital assemblies.

References Cited

UNITED STATES PATENTS

| | | | |
|---|---|---|---|
| 2,178,637 | 11/1939 | Link | 88—24 |
| 2,400,840 | 5/1946 | Peters | 88—24 |
| 2,685,818 | 8/1954 | Mihalakis | 88—24 |
| 3,026,512 | 3/1962 | Baker | 88—24 |

NORTON ANSHER, *Primary Examiner.*

RICHARD M. SHEER, *Assistant Examiner.*